United States Patent [19]
Kindersley

[11] 4,049,105
[45] Sept. 20, 1977

[54] DIVERTER VALVE

[75] Inventor: Peter G. Kindersley, Glens Falls, N.Y.

[73] Assignee: Kamyr Incorporated, Glen Falls, N.Y.

[21] Appl. No.: 629,902

[22] Filed: Nov. 7, 1975

[51] Int. Cl.² .......................................... B65G 11/20
[52] U.S. Cl. ................................ 193/31 R; 137/610; 137/625.47
[58] Field of Search ................... 193/14, 23, 29, 31 R, 193/31 A; 243/31; 137/610, 611, 612, 625.11, 625.47; 302/27, 28

[56] References Cited
U.S. PATENT DOCUMENTS

| 362,917 | 5/1887 | Exner | 137/610 |
| 422,770 | 3/1890 | Grasser | 137/610 |
| 481,080 | 8/1892 | Thompson | 193/23 |
| 850,762 | 4/1907 | Kolla | 137/610 |
| 967,460 | 8/1910 | Straub | 137/610 X |
| 1,195,838 | 8/1916 | Morgan | 193/23 |
| 1,561,344 | 11/1925 | Millar | 251/310 |
| 1,958,228 | 5/1934 | Beardsley | 137/625.47 X |
| 3,199,537 | 8/1965 | Swanson | 137/610 X |

Primary Examiner—Johnny D. Cherry
Assistant Examiner—James L. Rowland
Attorney, Agent, or Firm—John W. Malley

[57] ABSTRACT

A diverter valve assembly that diverts flowable material from an inlet to one of a plurality of outlets. An outer tubular housing has an inner element mounted therein for rotation with respect to the housing about a generally vertical axis of rotation. The inner element is in the shape of a truncated cone. An inlet is provided at the top of the housing and a plurality of outlets are spaced around the sides thereof. A diverter element is rigidly mounted to the inner element and extends through the open top of the inner element and through a side thereof — 90° from the open top — to cooperate with one of the plurality of outlets. Outlet arm members extend through the housing and make sealing contact with the outer surface of the inner element. Rotation of the inner element to position in cooperation with a particular outlet allows the flow of flowable material through the housing inlet, through the diverter element, and through the particular outlet arm.

8 Claims, 2 Drawing Figures

DIVERTER VALVE

BACKGROUND AND SUMMARY OF THE INVENTION

The invention relates to a valve assembly for the diversion of gravity-fed flowable material from an inlet to one of a plurality of outlets while precluding the flow of material through the other outlets. While numerous prior art arrangements are known for the diversion of flowable material from an inlet to one of a plurality of outlets — such as shown in U.S. Pat. Nos. 416,391, 850,762, 3,199,537, and 3,536,098 — when leakage occurs in such prior art devices it normally results in flowable material being delivered to an outlet to which no flowable material should be delivered. While it is believed that this problem has been solved with respect to solids by the invention of my copending U.S. application Ser. No. 621,564, filed Oct. 10, 1975 and entitled "Solids Diverter Valve", when liquids and solids are to be handled difficulties arise.

According to the present invention, diversion of flowable material — either liquids or solids — from an inlet to only one of a plurality of outlets — and not the other outlets — is provided. The present invention consists of a tubular housing having a flowable material inlet at the top thereof, and outlets around the sides thereof. An inner element having the form of a truncated cone is rotatably mounted with respect to the housing within the housing. A tubular diverter element is mounted in the inner element and has one open end thereof corresponding to the housing inlet, and the other open end thereof — located generally 90° from the one open end — corresponding to the housing outlets. Outlet arm members extend through the housing and into contact with the outer surface of the inner element to form a seal (metal-to-metal) therewith, and in that way if the diverter element opening is not exactly lined up with a housing opening and an outlet arm extending therethrough, the other housing arms will be in sealing engagement with the outer surface of the inner element and any liquid or other flowable material that leaks from the diverter element will leak into the area between the inner element and the housing, and will not leak into any other outlets. If desired, a drain outlet may be provided for the area between the inner element and housing.

It is the primary object of the present invention to provide a diverter valve that will divert flowable material — whether solid particles or liquid — from an inlet to one of a plurality of outlets while precluding diversion to the other outlets. This and other objects of the invention will become clear from an inspection of the detailed description of the invention, and from the appended claims.

DETAILED DESCRIPTION OF THE INVENTION

Figure 1:
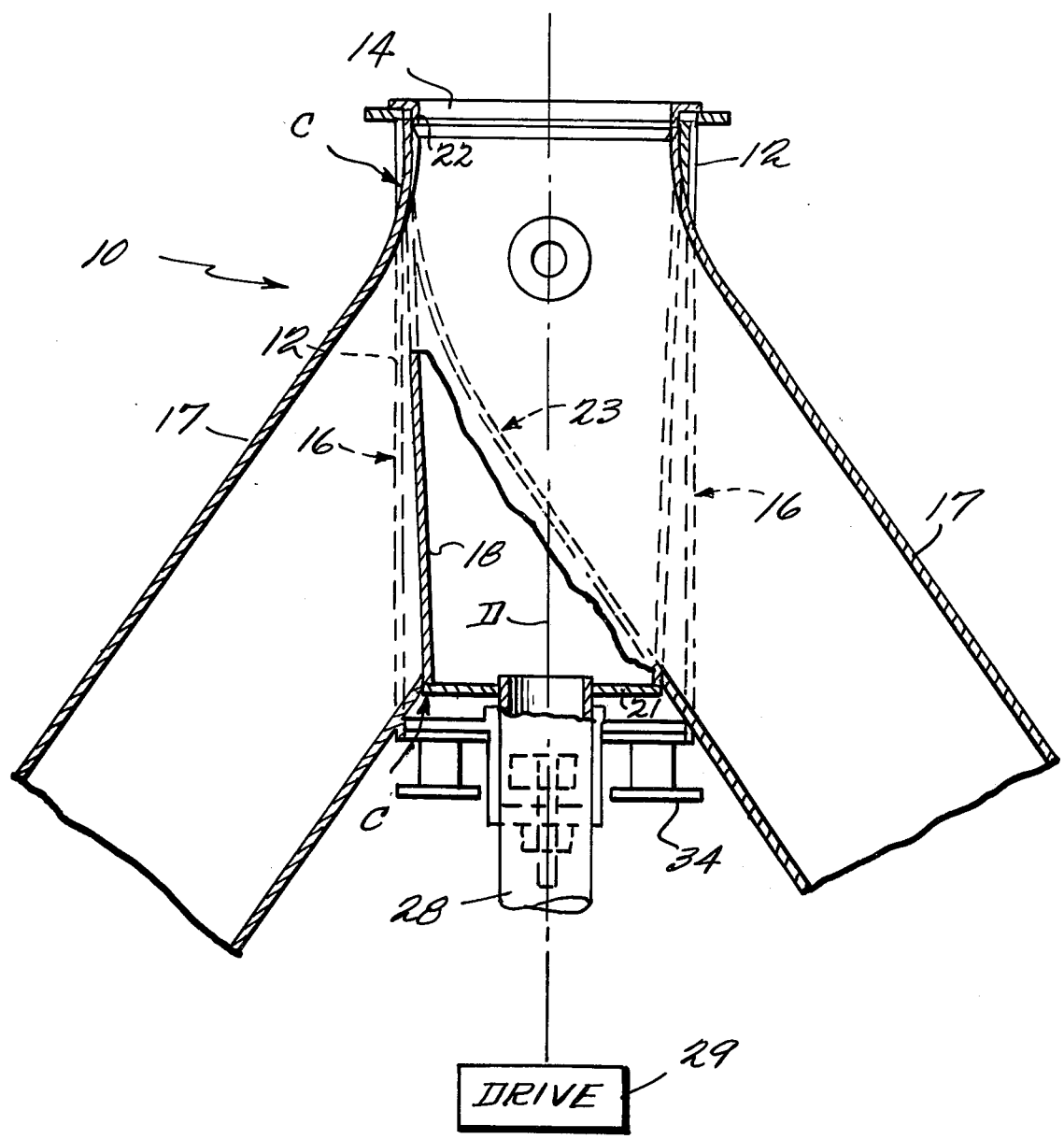
FIG. 1 is a side view, partly in section and partly in elevation, of an exemplary valve assembly according to the teachings of the present invention.

An exemplary diverter valve assembly for diverting the flow of solids or liquids from one inlet to a selected one of a plurality of outlets is shown generally at 10 in FIG. 1. The valve assembly 10 consists of an outer tubular housing 12 of substantially constant diameter, and having an inlet 14 located vertically above a plurality of outlets 16 spaced substantially 90° therefrom. The outlets 16 are defined by arm members 17. While two outlets 16 are shown, it is to be understood that a larger number thereof may be provided if desired, and while the outlets 16 are shown spaced from each other 180°, they may be spaced from each other different amounts. Also, the length of the arm members 17 of the outlets 16 may be different depending upon what they are to lead to. Each of the outlet arms 17 is attached to the outside of the outer housing 12, and an opening corresponding to the shape of an arm 17 is provided in housing 12 at each outlet 16.

Disposed within the housing 12 is a metal inner element 18 which has the shape of a truncated cone, being only slightly smaller in diameter than the housing 12 at the top thereof near inlet 14, and tapering down to a diameter substantially smaller than that of housing 12 near the bottom thereof. The housing 12 and element 18 have a space A therebetween. The inner element 18 has an open top 20 and has a closed bottom 21. A lip 22 extending downwardly from the top of the housing 12 overlaps the open top 20 of element 18 so that flowable material will normally pass directly to the interior of element 18, and will not spill over the top thereof into the space A in-between the element 18 and housing 12. Located within the truncated cone interior element 18 and rigidly attached thereto is a hollow diverting element 23 which is in the form of a curved tubular member having one open end 24 thereof located in cooperation with inlet 14 and having the other open end 24' thereof located for cooperation with an outlet 16, being positioned substantially 90° from the opening 24. The diverter element 23 is rigidly attached to inner element 18 by an annular weld 25 or the like extending around the periphery of the opening 24, and by an annular weld 26 or the like extending around the periphery of the opening 24'. The portions of element 23 defining openings, 24, 24' extend through the walls of the inner element 18, as may be seen in FIG. 2. The whole diverter element 23 and inner element 18 combination is rotatable about a generally vertical axis D forming the centerline of housing 12, being mounted on a shaft 28 or the like which may be powered by a drive means 29. The element 18 can thus be rotated from a first position wherein the diverter opening 24' is in communication with the right-hand (as viewed in FIG. 1) outlet 16, to a second position wherein opening 24' is in communication with the left-hand (as viewed in FIG. 1) outlet 16. Thus flowable material introduced into valve assembly 10 through inlet 14 may be diverted to any one of a plurality of outlets 16 while it is precluded from flowing through the other outlets.

Figure 2:
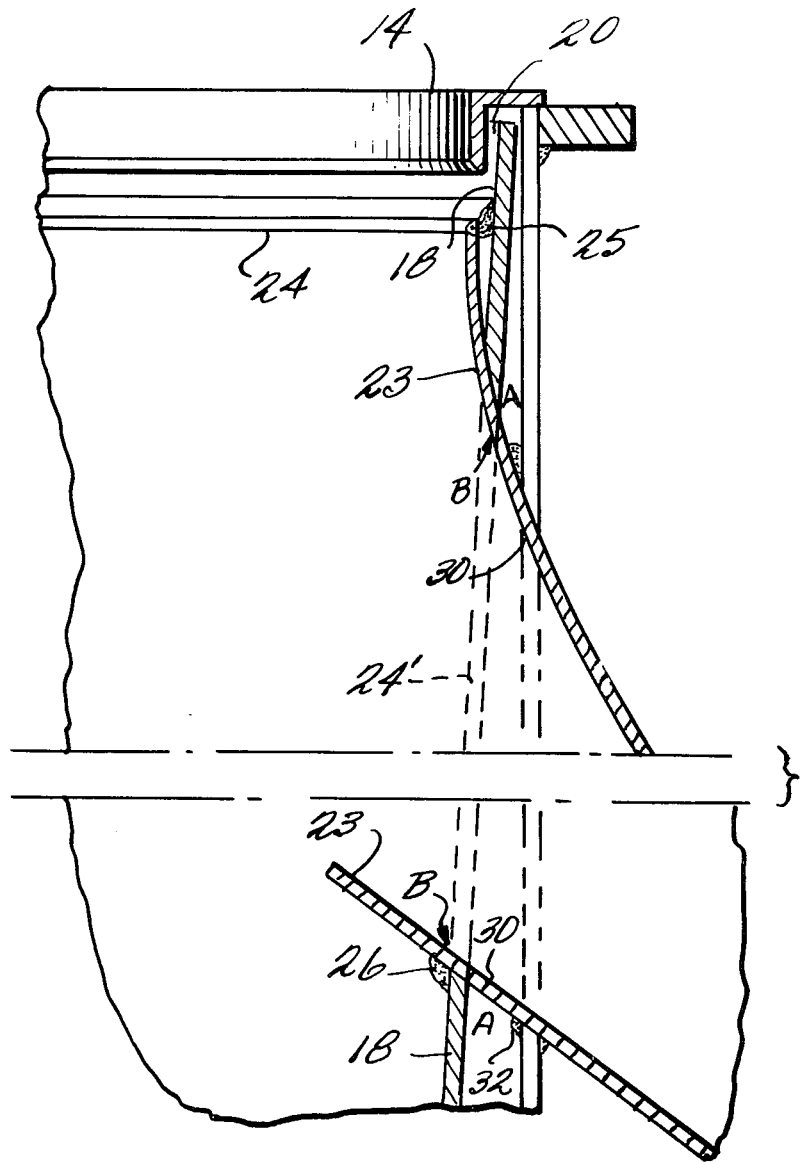
FIG. 2 is a detail cross-sectional view showing the interengagement between the inner element and an outlet arm member of the FIG. 1 device.

In order to provide for proper sealing engagement of the members to allow valving of liquids, end portions 30 of outlet arms 17 extend inwardly into the housing 12 into engagement with the outer surface of inner element 18. This relationship can be most clearly seen in FIG. 2, wherein portions 30 are located in the space A between housing 12 and inner element 18, the arms 17 being attached as by annular welds 32 to the housing 12 to properly position the portions 30. As can be seen in FIGS. 1 and 2, the end portions 30 are shaped so that they correspond to the taper of the element 18 so that tight sealing engagement is provided thereby. When the opening 24' of diverter element 23 is located in precise communication with a metal outlet arm 17, as shown in FIG. 2, sealing contact between diverter element 23 (which has the end thereof coterminus with the outer surface of element 18) is made along surface B. At the same time, the portions 30 of the other (or a number of other) outlet arm 17 is making metal-to-metal sealing contact with a solid portion of the outer surface of element 18 at area C.

According to the present invention, it will be seen that even if the open end 24' of diverter element 23 does not line up properly with portions 30 of an outlet arm 17, so that no positive sealing is provided at area B, since a positive seal is provided at area C (a smooth cone surface always engaging the portions 30 until the opening 24' is rotated into cooperation therewith) even though liquid leaks into the area A between the housing 12 and inner element 18, it will not leak to the other outlet 16, but will be contained within the housing 12. If desired, drain outlets 34 may be provided in the bottom of housing 12 to allow for drainage of liquid that does leak into space A from the housing 12.

It will thus be seen that according to the present invention, a diverter valve is provided that may be used to divert flowable solids or liquids from an inlet to one of a number of outlets, not allowing flow through the other outlets. A tubular constant diameter outer housing containing a truncated cone inner element with a diverter element positioned therein, and outlet arms extending through the outer housing into engagement with the outside surface of the truncated cone inner element, provide the key features of the valve assembly of the invention and effect the leak-tight action thereof. While the invention has been herein shown and described in what is presently conceived to be the most practical and preferred embodiment, it will be apparent to those of ordinary skill in the art that many modifications may be made thereof within the scope of the invention. For example, the conical surface of the inner element can be covered with a softer coating to assist in quality of leak tightness. Alternatively it can be covered, or the pipe end can be covered, with a metallic or synthetic coating to ensure smooth rubbing of the cone on the pipe, with metallic galling. The scope of the invention is thus to be accorded the broadest interpretation of the appended claims so as to encompass all equivalent structures and devices.

What is claimed is:

1. A gravity-feed flowable material diverter valve assembly comprising
   a. a valve housing having an inlet, a tubular substantially constant diameter main body portion symmetrical about a generally vertical axis, and a plurality of outlets, said inlet being located vertically above said outlets,
   b. means for diverting flowable material flowing through said inlet to a selected one of said plurality of outlets while preventing delivery of flowable material to the other of said outlets, said means comprising
      i. an inner element in the shape of a truncated cone, said inner element concentric with and located in said housing and symmetrical about said generally vertical axis and spaced from said housing main body portion a distance that increases from said inlet toward said outlets, and extending generally the whole length of said housing, and mounted for non-eccentric rotation about said generally vertical axis,
      ii. a hollow diverter element mounted within and rigidly connected to said inner element and having a first end defining an open top thereof in communication with said housing inlet, and having a second end defining a side opening located about 90° from said open top end for communication with a selected one of said plurality of outlets, said inner element having top and side openings therein corresponding to said top and side openings of said diverter element,
      iii. a plurality of outlet arm members, one corresponding to each of said housing outlets, each of said arm members having a portion thereof extending through said housing and making sealing contact with the outer surface of said inner element, and
   c. means for rotating said inner element with respect to said housing about said generally vertical axis of rotation.

2. An assembly as recited in claim 1 wherein the upper portion of said inner element extends upwardly above the upper portion of said diverter element, and wherein a lip defining said housing inlet extends downwardly from the top of said housing toward said diverter element and overlaps the upper portion of said inner element so that flowable material may not enter the space between said inner element and said housing at said inlet.

3. An assembly as recited in claim 2 further comprising a drain outlet formed in the bottom of said housing to provide for drainage of flowable material from the space between said housing and said inner element.

4. An assembly as recited in claim 2 wherein said second end of said diverter element extends through said inner element to define said side opening of said inner element, and is flush with the outer surface of said inner element.

5. An assembly as recited in claim 2 wherein said outlet arm members are welded to said housing.

6. An assembly as recited in claim 1 further comprising a drain outlet formed in the bottom of said housing to provide for drainage of flowable material from the space between said housing and said inner element.

7. An assembly as recited in claim 1 wherein said second end of said diverter element extends through said inner element to define said side opening of said inner element, and is flush with the outer surface of said inner element.

8. An assembly as recited in claim 1 wherein said outlet arm members are welded to said housing.

* * * * *